US011089632B2

(12) United States Patent
Pan et al.

(10) Patent No.: US 11,089,632 B2
(45) Date of Patent: Aug. 10, 2021

(54) ENHANCED ACCESS LINK FOR IAB IN NR

(71) Applicant: IDAC Holdings, Inc., Wilmington, DE (US)

(72) Inventors: Kyle Jung-Lin Pan, Saint James, NY (US); Fengjun Xi, San Diego, CA (US)

(73) Assignee: IDAC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/583,792

(22) Filed: Sep. 26, 2019

(65) Prior Publication Data

US 2020/0100298 A1    Mar. 26, 2020

Related U.S. Application Data

(60) Provisional application No. 62/736,711, filed on Sep. 26, 2018.

(51) Int. Cl.
| | |
|---|---|
| *H04W 74/08* | (2009.01) |
| *H04W 72/04* | (2009.01) |
| *H04W 56/00* | (2009.01) |
| *H04W 76/27* | (2018.01) |
| *H04W 92/04* | (2009.01) |

(52) U.S. Cl.
CPC ..... *H04W 74/0833* (2013.01); *H04W 56/001* (2013.01); *H04W 56/0045* (2013.01); *H04W 72/042* (2013.01); *H04W 76/27* (2018.02); *H04W 92/045* (2013.01)

(58) Field of Classification Search
CPC ......... H04W 74/0833; H04W 28/0231; H04W 28/0278
See application file for complete search history.

(56) References Cited

U.S. PATENT DOCUMENTS 9,730,114 B2 * 8/2017 Han ...................... H04L 65/60
2020/0068616 A1 * 2/2020 Qian ................ H04W 74/0833

OTHER PUBLICATIONS

ITU-R, "IMT Vision—Framework and Overall Objectives of the Future Development of IMT for 2020 and Beyond", Recommendation ITU-R M.2083-0, M Series, Mobile, Radiodetermination, Amateur and Related Satellite Services, Sep. 2015, 21 pages.

* cited by examiner

*Primary Examiner* — Chandrahas B Patel
(74) *Attorney, Agent, or Firm* — Condo Roccia Koptiw LLP

(57) ABSTRACT

In an integrated access and backhaul (IAB) system, an access WTRU may receive a random access channel (RACH) occasion (RO) configuration comprising one or more RO resources from a first integrated access backhaul (IAB) node. The access WTRU may receive an indication that one or more of the configured RO resources have an overlap with one or more IAB node RO resources. The access WTRU may monitor and receive the ROI indicating the configured RO resources that overlap with the one or more IAB node RO resources. Based on the received ROI and the configured RO resources, the access WTRU may determine one or more RO resources available for PRACH transmission. The access WTRU may select an RO resource from the available RO resources for PRACH transmission. The access WTRU may send a first PRACH transmission to the first IAB node using the selected RO resource.

14 Claims, 15 Drawing Sheets

ENHANCED ACCESS LINK FOR IAB IN NR

CROSS-REFERENCE TO RELATED APPLICATIONS

This application claims the benefit of U.S. Provisional Patent Application No. 62/736,711, filed Sep. 26, 2018, the contents of which are incorporated by reference.

BACKGROUND

A classification of the use cases for emerging 5G systems may include one or more of the following: Enhanced Mobile Broadband (eMBB), Massive Machine Type Communications (mMTC), and Ultra Reliable and Low latency Communications (URLLC). Different use cases may focus on different requirements, such as, higher data rates, higher spectrum efficiency, lower power usage, higher energy efficiency, lower latency, and/or higher reliability. A wide range of spectrum bands (e.g., ranging from 700 MHz to 80 GHz) may be considered for a variety of deployment scenarios.

As the carrier frequency increases, severe path loss may become a crucial limitation to guarantee a sufficient coverage area. Transmission in millimeter wave systems may suffer from non-line-of-sight losses, e.g., diffraction loss, penetration loss, oxygen absorption loss, foliage loss, etc. During initial access, the base station and wireless transmit receive units (WTRUs) may overcome these high path losses and discover each other. Utilizing dozens or even hundreds of antenna elements to generate a beam formed signal may compensate the severe path loss, e.g., by providing significant beam forming gain. Beamforming techniques may include digital, analogue, and hybrid beamforming. Distance between a WTRU and a backhaul node may be different than the distance between various backhaul nodes. Current random access channel (RACH) procedures may not be suitable for deployments comprising access WTRUs and backhaul nodes.

SUMMARY

Systems, methods, and instrumentalities are disclosed for an integrated access and backhaul (IAB) system comprising or one or more access WTRUs and one or more IAB backhaul nodes. An access wireless transmit/receive unit (WTRU) may receive a random access channel (RACH) occasion (RO) configuration comprising one or more RO resources from a first integrated access backhaul (IAB) node. The access WTRU may receive the RO configuration via a radio resource control (RRC) signaling or via system information (e.g., a system information block). The access WTRU may also receive an indication that one or more of the configured RO resources have an overlap with one or more IAB node RO resources. The access WTRU may monitor an RO indicator (ROI) to determine the configured RO resources that overlap with the one or more IAB node RO resources. The access WTRU may receive the ROI indicating the configured RO resources that overlap with the one or more IAB node RO resources. The access WTRU may receive the ROI in a physical control channel (PDCCH) transmission, for example, via a downlink control information (DCI).

Based on the received ROI and the configured RO resources, the access WTRU may determine one or more RO resources available for PRACH transmission. The access WTRU may determine the ROs that are used by the first IAB node and therefore not available and the ROs that are not used by the first IAB node and therefore available.

The access WTRU may select an RO resource from the available RO resources for PRACH transmission. The access WTRU may send a first PRACH transmission (e.g., a PRACH preamble transmission) to the first IAB node using the selected RO resource.

The access WTRU may perform radio link failure recovery or beam failure recovery. The access WTRU may determine a timing difference of channel time delay between a first channel associated with the first IAB node and a second channel associated with a second IAB node. The access WTRU may determine timing advance (TA) value associated with the second IAB node. The TA value may be determined based on the timing difference of the channel time delay between the first channel and the second channel and the TA value associated with the first IAB node. The timing difference of the channel time delay between the first channel and the second channel may be determined by comparing a first receive timing obtained from a first synchronization signal block (SSB) received from the first IAB node and a second receive timing obtained from a second SSB received from the second IAB node.

The access WTRU may determine a radio link failure or a beam failure has occurred with the first IAB node. The access WTRU may send a second PRACH transmission to the second IAB node using the determined TA value associated with the second IAB node.

DETAILED DESCRIPTION

A detailed description of illustrative examples will now be described with reference to the various figures. Although this description provides a detailed example of possible implementations, it should be noted that the details are intended to be exemplary and in no way limit the scope of the application.

Figure 1A:
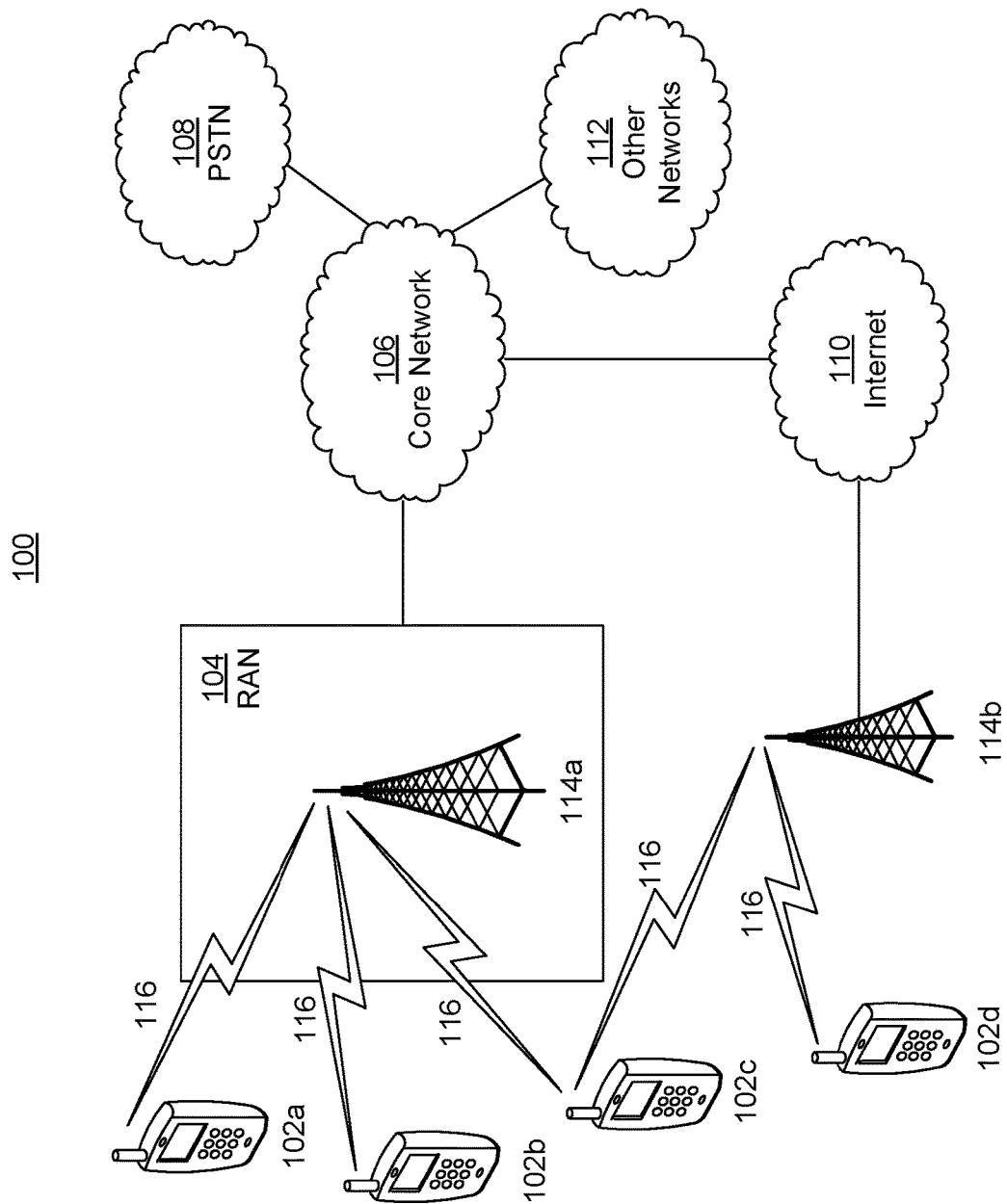
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
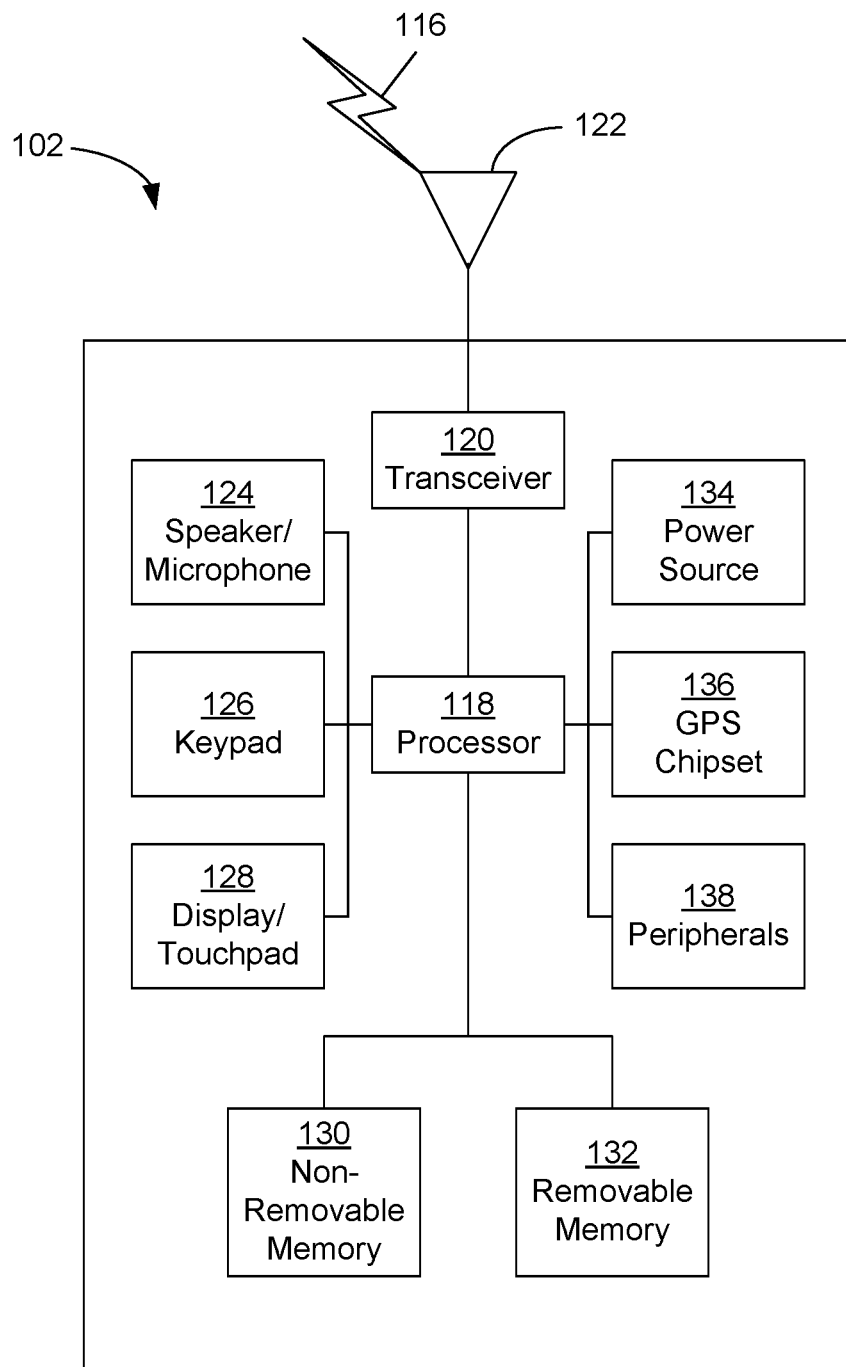
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
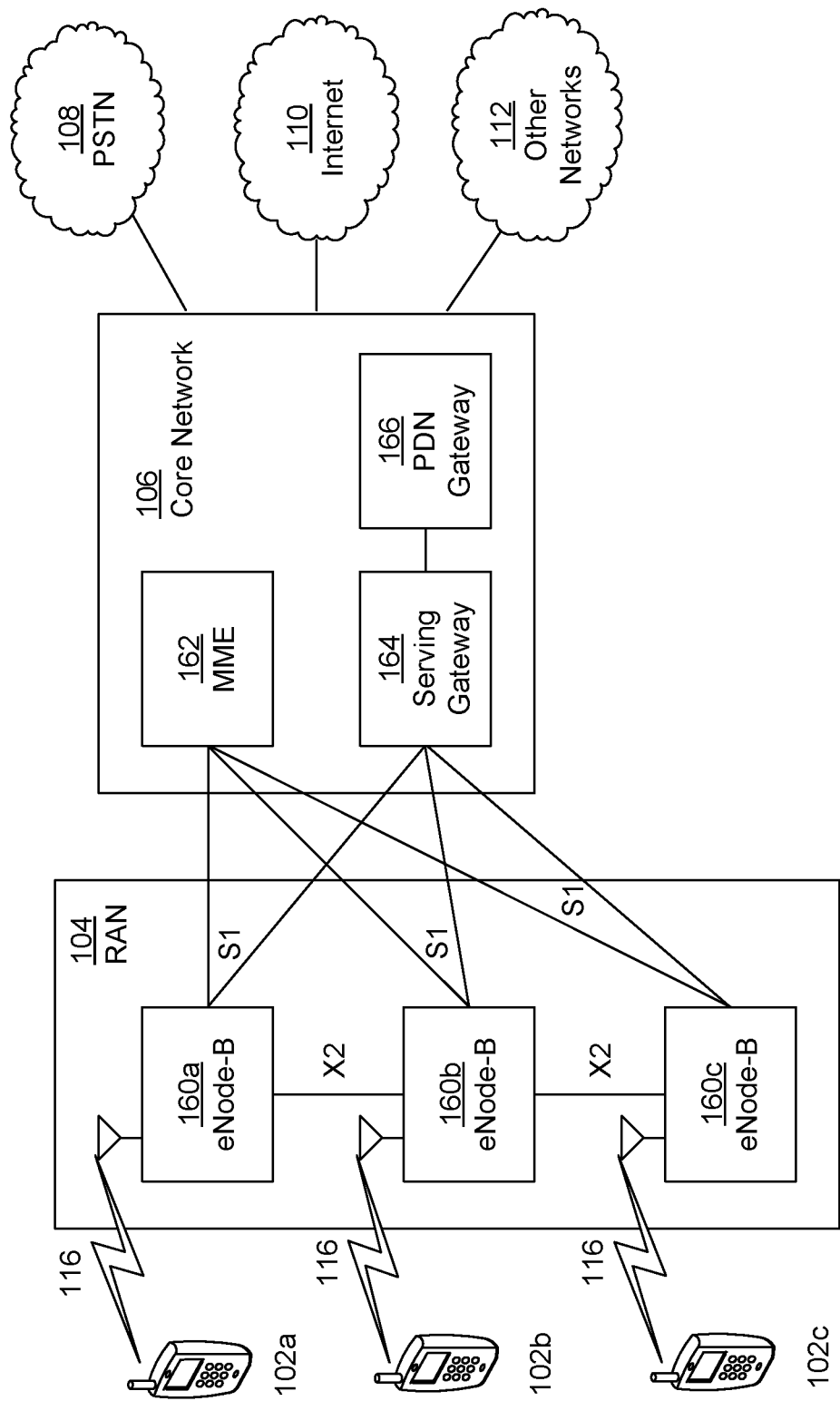
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
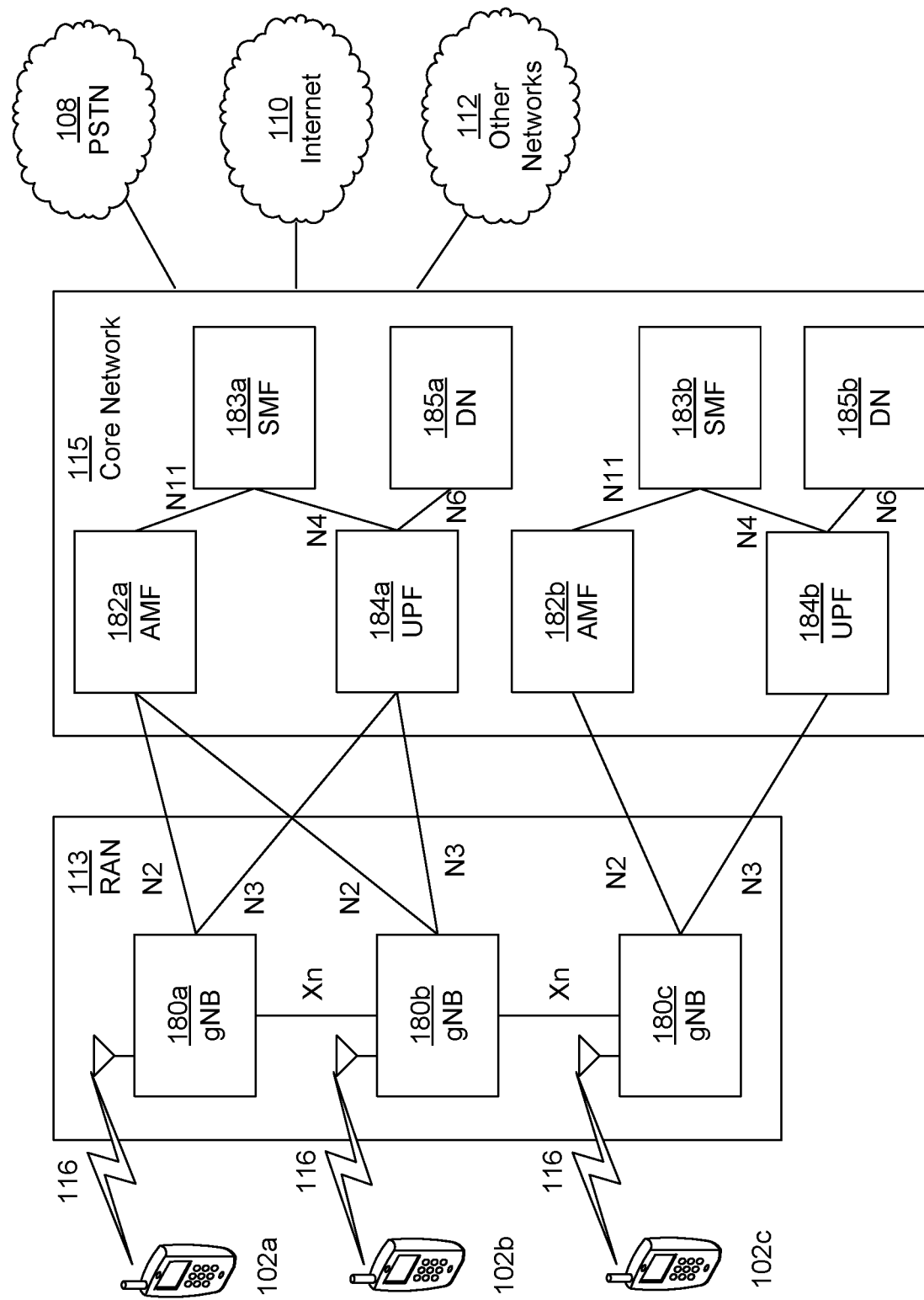
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 2:
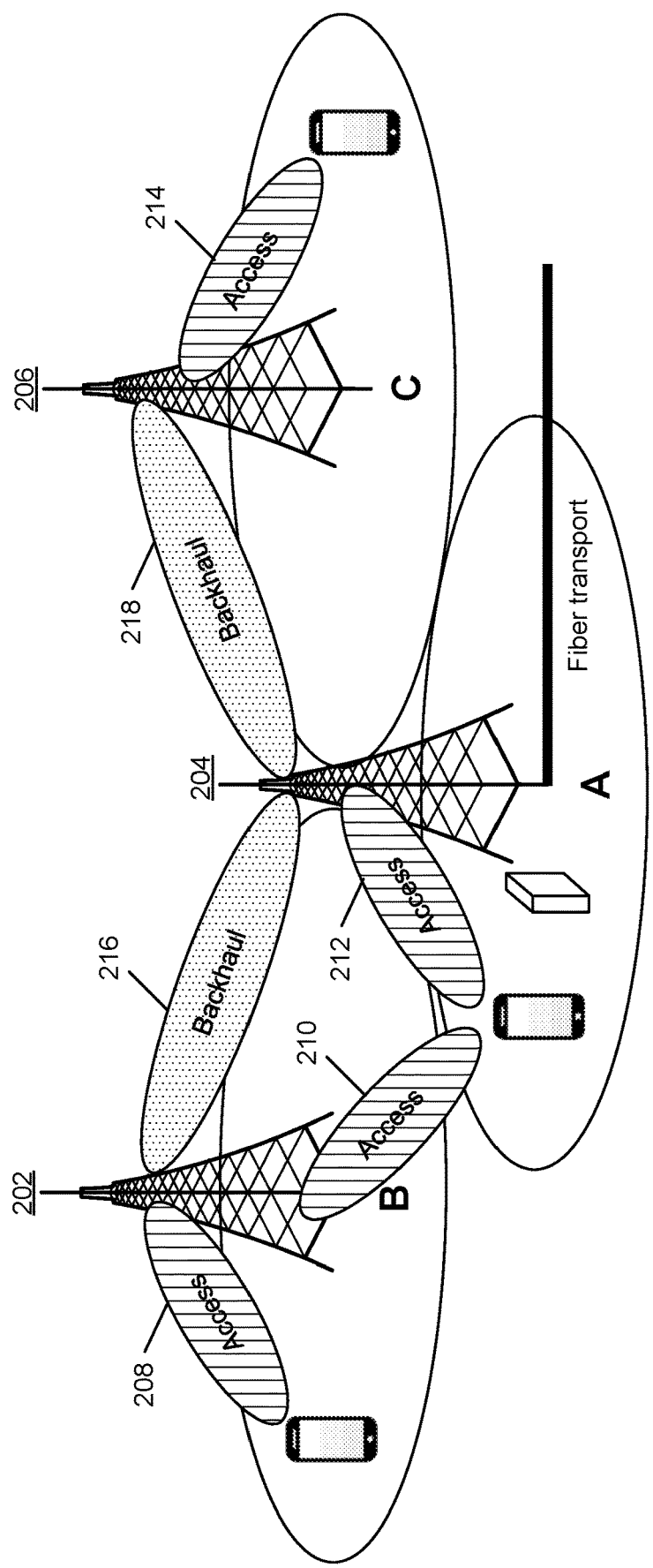
FIG. 2 is an exemplary integrated access and backhaul (IAB) system with access links and backhaul links.

Integrated Access and Backhaul (IAB) systems may comprise one or more IAB parent nodes, one or more IAB child nodes, one or more access WTRUs, etc. IAB systems may be implemented for new radio (NR) or fifth generation (5G) deployments. Wireless backhaul and relay links may be utilized as one of the technologies to enable deployment of cellular networks scenarios and applications. The wireless backhaul and relay links may enable a flexible and dense deployment of cells, for example, without densifying the transport network proportionately. Due to an expected increase in available bandwidth (e.g., by utilizing millimeter wave (mmWave) spectrum) along with the native deployment of massive multiple input multiple output (MIMO) or multi-beam systems, integrated access and backhaul links may be developed and/or deployed. As a result, dense network of self-backhauled cells (e.g., NR or 5G cells) may be deployed in an integrated manner (e.g., by building upon many of the control and data channels/procedures defined for providing access to WTRUs). An example illustration of a network with such an integrated access and backhaul links is shown in FIG. 2. As illustrated in FIG. 2, relay nodes or relay transmission points relay transmission point devices (rTRPs) 202, 204, and 206 may multiplex access links 208, 210, 212, and 214, and backhaul links 216 and 218 in time, frequency, or space utilizing, for example, utilizing beam-based operation.

The backhaul links, access links, etc. may operate on the same or different frequencies. The backhaul and/or access links operating on same frequencies may be referred to as in-band links, whereas backhaul and/or access links operating on different frequencies may be referred to as out-of-band relays. While efficient support of out-band relays may be important for some deployments (e.g., NR or 5G deployments), the requirements of in-band operation may imply tighter interworking with the access links operating on the same frequency (e.g., to accommodate duplex constraints and avoid/mitigate interference). The operation of systems (e.g., NR or 5G systems) in mmWave spectrum may present challenges, for example, including experiencing severe short-term blocking that may not be readily mitigated by typically utilized radio resource control (RRC)-based handover mechanisms (e.g., due to the larger time-scales used for completion of the procedures compared to short-term blocking). Overcoming short-term blocking in mmWave systems may include implementing fast RAN-based mechanisms for switching between rTRPs, with the switching between the rTRPs performed without involvement of the core network. The need to mitigate short-term blocking for NR operation in mmWave spectrum along with the desire for easier deployment of self-backhauled NR cells may create a need for the development of an integrated framework that allows fast switching of access and backhaul links. Over-the-air (OTA) coordination between rTRPs may be considered (e.g., to mitigate interference and support end-to-end route selection and optimization). IAB systems may be utilized during network rollout or initial network growth phase.

In IAB systems, a random access channel (RACH) may be designed for an access WTRU in an access link and/or an IAB node in a backhaul link. The access distance for an IAB node may be larger than the access distance for an access WTRU. Some of the RACH configuration and methods used may not be adequate. RACH configuration and methods may be provided to satisfy the RACH characteristics (e.g., the RACH requirements) of the IAB node and the access WTRU. To support the PRACH transmission for an IAB node and an access WTRU, for example, the PRACH configuration, preamble format, and preamble configuration may be updated. A RACH method may be designed to support multiplexing of a RACH transmission from an access WTRU and a RACH transmission from an IAB node.

A WTRU may perform radio link monitoring, e.g., in a NR network. If a WTRU determines and/or declares a radio link failure (RLF), the WTRU may perform RACH procedures to access (e.g., re-access) the network. IAB nodes may perform radio link monitoring to monitor the backhaul link(s) with other IAB nodes. One or more of the following may apply: an IAB node may monitor its links with other IAB nodes, and/or the IAB node may monitor the links of other IAB nodes. If an IAB node determines a radio link failure with the other IAB node has occurred, statuses of the IAB node as well as the children of the IAB node may be checked. When an IAB node selects its parent node, it may depend on one or more factors other than the reference signal received power (RSRP) of the received synchronization signal blocks (SSBs) from a candidate parent node. An IAB node may coordinate transmission and reception of one or more of the following: SSBs, channel state information reference signals (CSI-RSs), other reference signals, or other measurement signals. The IAB node may coordinate the transmission and reception the reference and/or measurement signals orthogonally in time domain, for example, due to the half-duplex constraint of the IAB node.

Figure 3:
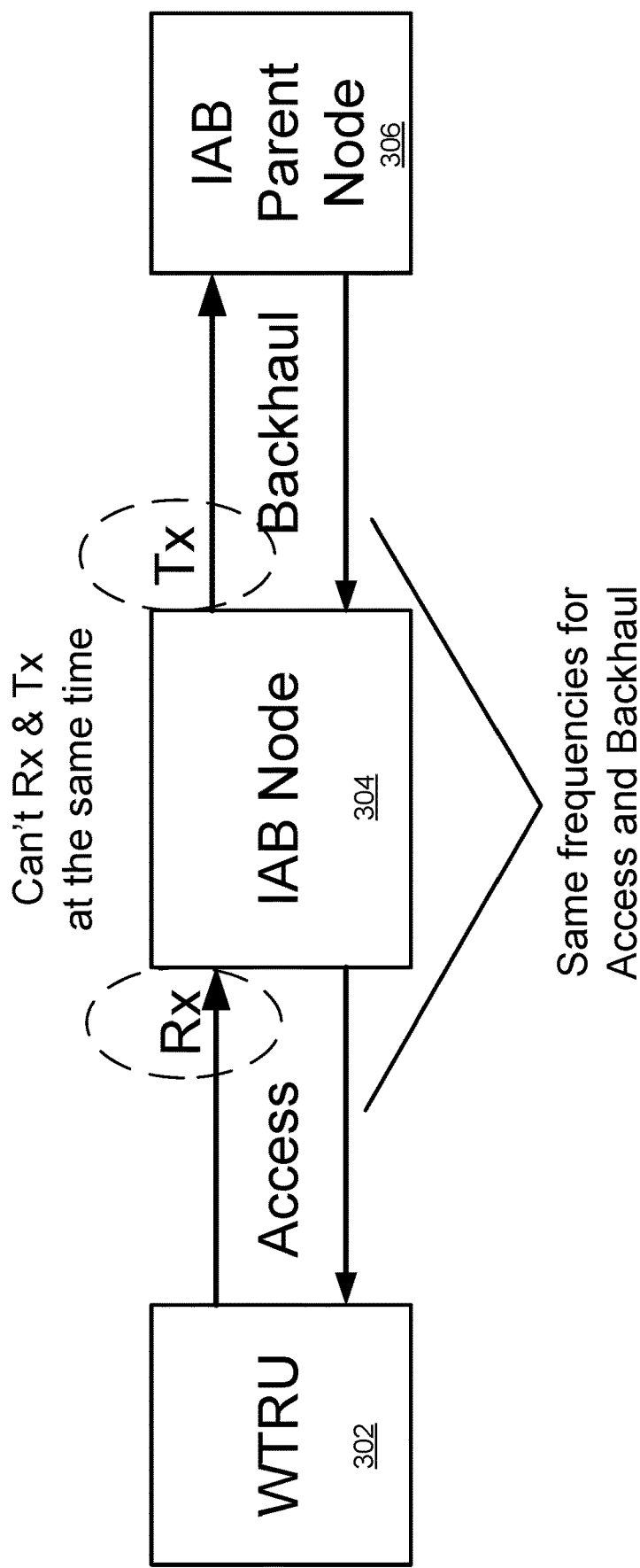
FIG. 3 is an exemplary IAB system with half-duplex constraints for access link between the access WTRU and an IAB node.

In an IAB system, an IAB node, for example, due to the half-duplex constraint may not simultaneously transmit and receive data or signals. FIG. 3 illustrates an example where the IAB Node 304 may be connected to an access WTRU 302 and a parent IAB node 306. Due to half-duplex, the IAB node 304 may be configured to coordinate the transmission and/or reception in time domain.

In an IAB system, an IAB node may transmit one or more reference or measurement signals for IAB node discovery using a resource. When the IAB node transmits the reference or measurement signals, one or more other IAB nodes may monitor the reference or measurement signals. Resource allocation between backhaul links and access links may be provided, for example, by utilizing time division multiplexing/frequency division multiplexing/spatial division multiplexing (TDM/FDM/SDM). The resource allocation type, (e.g., dynamic or semi-static method) may be addressed. When FDM/SDM is used for multiplexing on a backhaul link and an access link, there may be cross link interference. Such a cross link between access links and backhaul links may be addressed.

Random access multiplexing (e.g., dynamic random access multiplexing) and physical random access channel (PRACH) resource collision handling may be performed for an access WTRU that is a part of an IAB system. IAB system may support the ability of a network to configure (e.g., flexibly configure) backhaul RACH resources with different occasions, periodicities, and/or formats (e.g., as compared to access RACH resources). After initial access, mechanisms may be provided to configure IAB nodes and access WTRU of the IAB nodes mother node. Mechanisms may be provided to identify time division multiplexed (TDMed) PRACH occasions. RACH formats and/or configurations for IAB system may be specified. In IAB systems, a time-domain multiplexed RACH occasion (e.g., a dynamic TDMed RACH occasion) for parent IAB node and a child node may be provided. Child nodes may include a child WTRU or a child IAB node. Child nodes may include other types of nodes. PRACH and RACH may be used interchangeably.

A mechanism may be provided to handle collisions of RACH occasions for WTRUs and IAB nodes (e.g., when the WTRUs and IAB nodes have the same PRACH configurations, or when the WTRUs and IAB nodes have different PRACH configurations and overlapped RACH occasions (ROs)).

Figure 4:
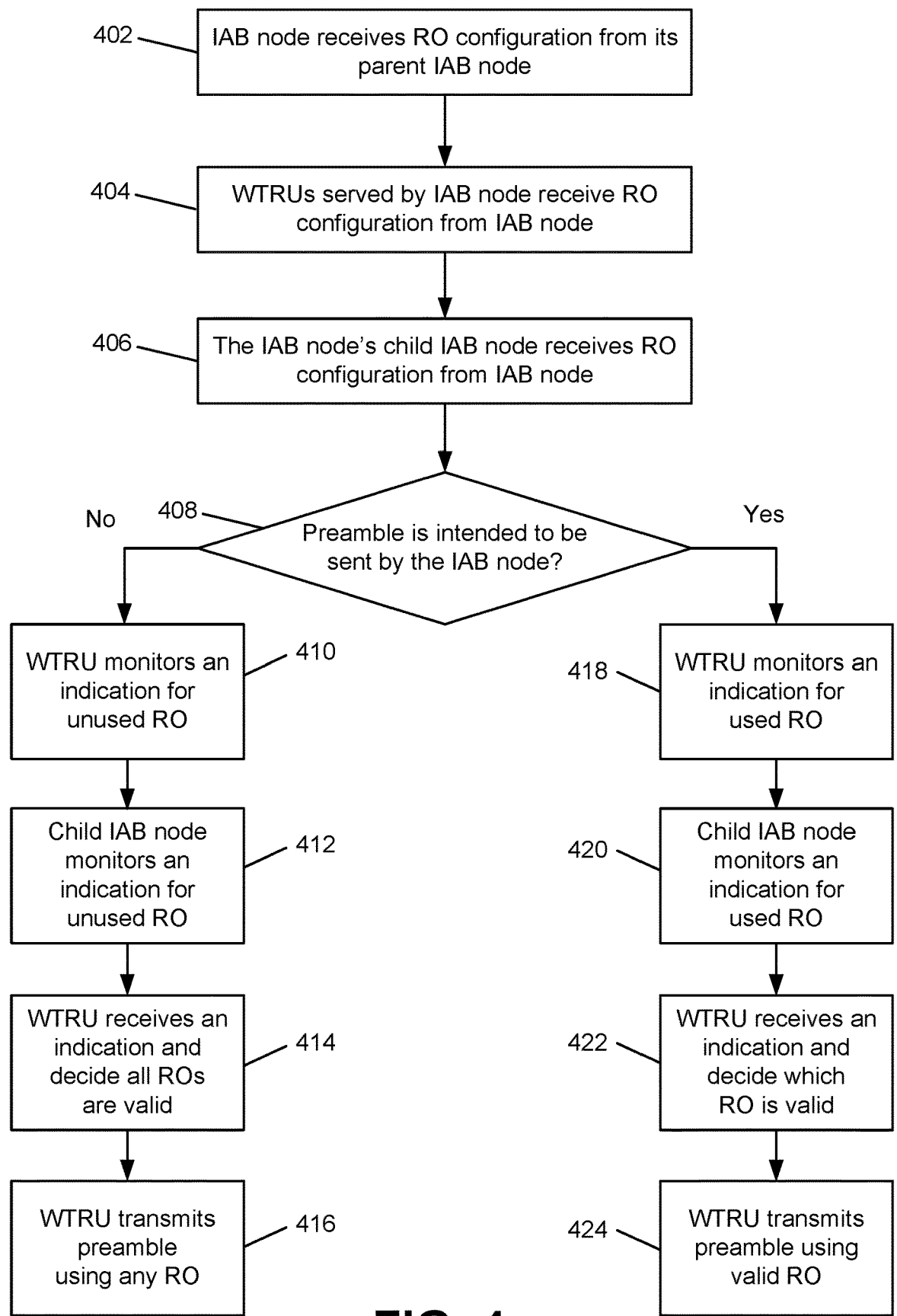
FIG. 4 is an exemplary flow chart illustrating random access channel (RACH) multiplexing and RACH occasion (RO) collision handling of an access WTRU.

FIG. 4 illustrates an example of RACH multiplexing (e.g., dynamic RACH multiplexing) and RO collision handling for access WTRUs in an IAB system. As illustrated in FIG. 4, at 402, an IAB node may receive a RACH occasion configuration from its parent IAB node. At 404, WTRUs that are served by the IAB node may receive the RACH occasion configuration from the IAB node. At 406, a child IAB node may receive the RACH occasion configuration from the IAB node. In an example, the ROs configured for an IAB node to send a preamble to the IAB node's parent IAB node may overlap with the ROs configured for the IAB node's child WTRUs and child IAB nodes to receive preambles. At 408, a determination may be made whether an IAB node intends to send a preamble. An indication may be sent to the IAB node's WTRUs and child IAB nodes to indicate that ROs (e.g., all ROs) are not used and that the ROs (e.g., all ROs) are valid ROs (e.g., if the IAB node does not intend to transmit a preamble).

At 410, a WTRU may monitor the indication for unused RO(s) to determine the unused RO(s). At 412, a child IAB node may monitor an indication for unused RO(s). At 414, the WTRU may receive the indication for unused RO(s), and determine that the ROs (e.g., all ROs) are valid. At 416, the WTRU may transmit the preamble using one or more of the valid ROs (e.g., any of the ROs in the PRACH configuration).

An indication may be sent to the IAB node's WTRUs and child IAB nodes to indicate which RO or a set of ROs are used (e.g., if the IAB node intends to transmit a preamble). As illustrated in FIG. 4, at 418, a WTRU may monitor the indication for the used RO(s). At 420, a child IAB node may monitor an indication for unused RO(s). At 422, the WTRU may receive the indication and may determine one or more used RO(s) (e.g., and thus is invalid) and one or more not used RO(s) (e.g., and thus is valid). Valid RO(s) may be used by access WTRUs to transmit a preamble. The WTRU may select one of the valid ROs. The WTRU may transmit the preamble using the selected RO(s) that are determined to be valid.

Figure 5:
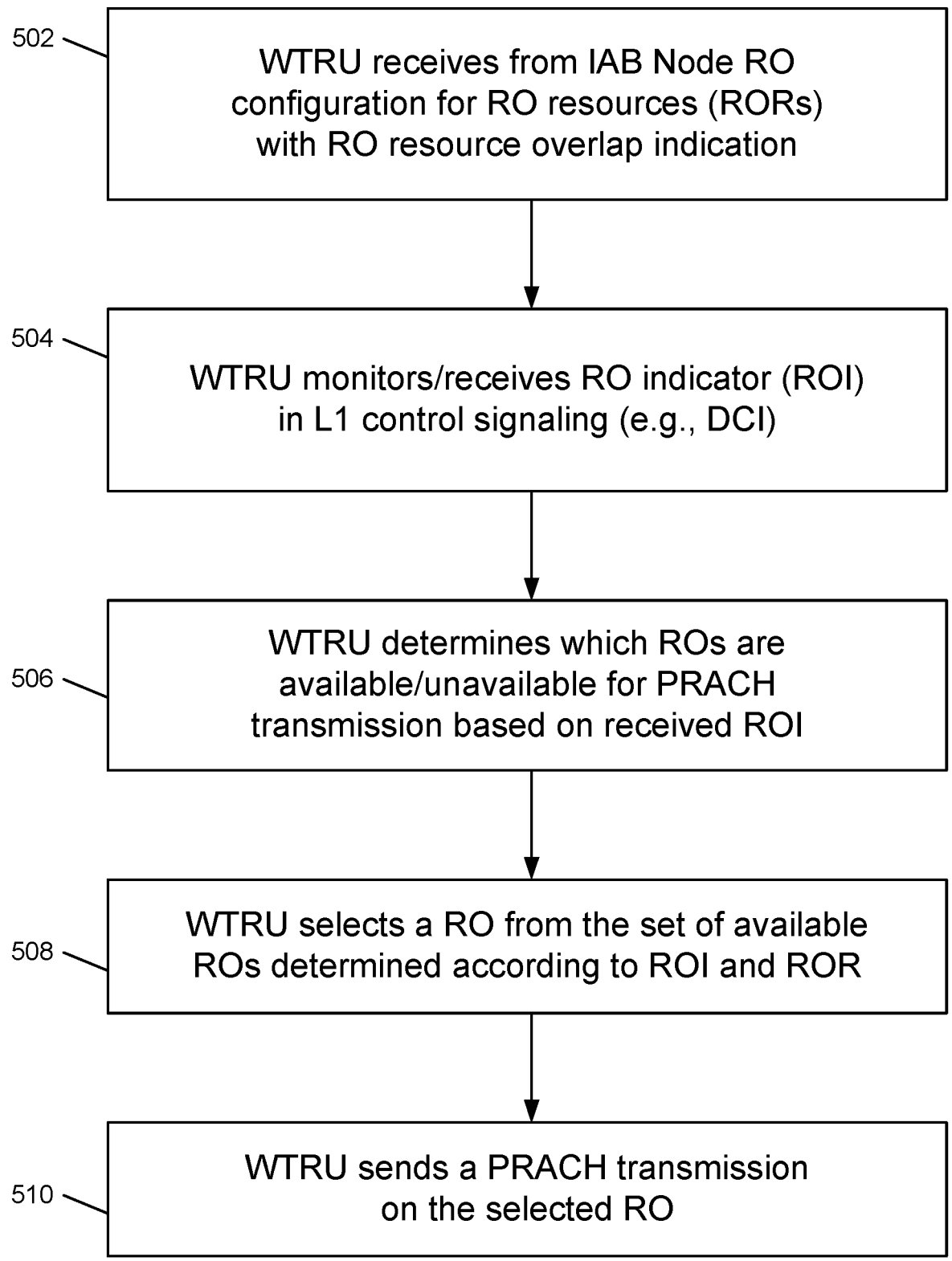
FIG. 5 is an exemplary flow chart illustrating dynamic random access resource multiplexing.
Figure 6:
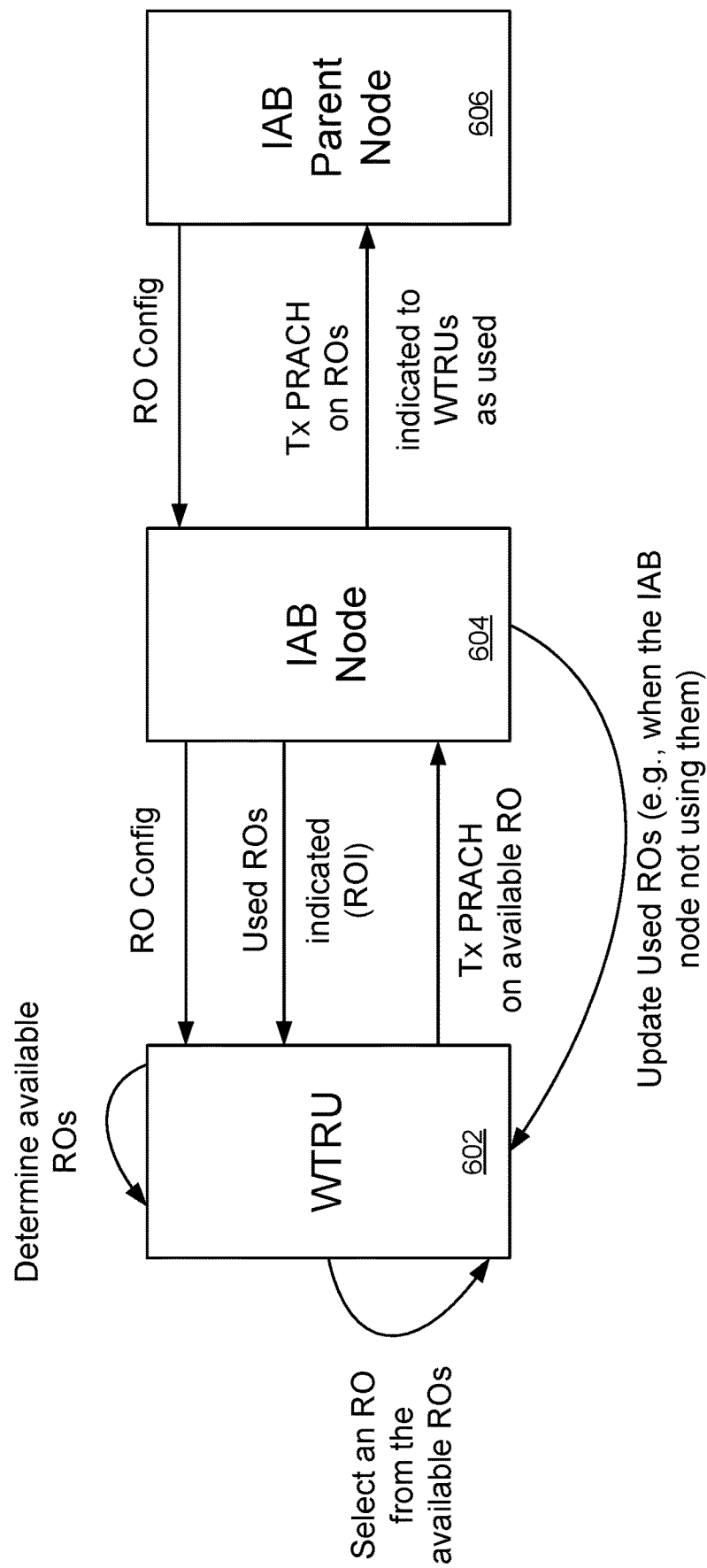
FIG. 6 is an IAB system diagram illustrating interactions between an access WTRU and an IAB node, for example, as illustrated in FIG. 5, and an IAB node and an IAB parent node.

FIG. 5 and FIG. 6 illustrate an example of an access WTRU 602 performing dynamic random access resource multiplexing. As illustrated in FIG. 5 and FIG. 6, at 502, the access WTRU 602 may receive RO configuration for RO resources (RORs) with RO resource overlap indication from the IAB Node 604. The terms RO, RO resource, and ROR may be used interchangeably. At 504, the access WTRU 602 may monitor and/or receive an RO indicator (ROI) from the IAB Node 604. ROI may indicate to the access WTRU 602 the RO resources that overlap with the one or more IAB node RO resources The access WTRU 602 may receive the ROI via Layer 1 control signaling, for example, via a DCI, for example, embedded in a physical downlink control channel (PDCCH) transmission. At 506, the access WTRU 602 may determine the RO resources that may be available or unavailable for PRACH transmission. The access WTRU may make the determination based on the received ROI. At 508, the access WTRU 602 may select an RO resource from the set of available RO resources. The access WTRU 602 may make the selection based on the received ROI and the available RORs. At 510, the access WTRU 602 may send a PRACH transmission on the selected RO resource. The selected PRACH transmission may comprise a PRACH preamble transmission. As illustrated in FIG. 6, in an example, the access WTRU 602 may receive, from the IAB Node 604, an update regarding the used (e.g., available vs non-available) RO resources. The IAB Node 604 may send the update to the access WTRU 602, for example, when the IAB Node is not using the RO resources. The access WTRU may treat the reception of the update as a repeat of receiving an ROI, as described herein.

Figure 7:
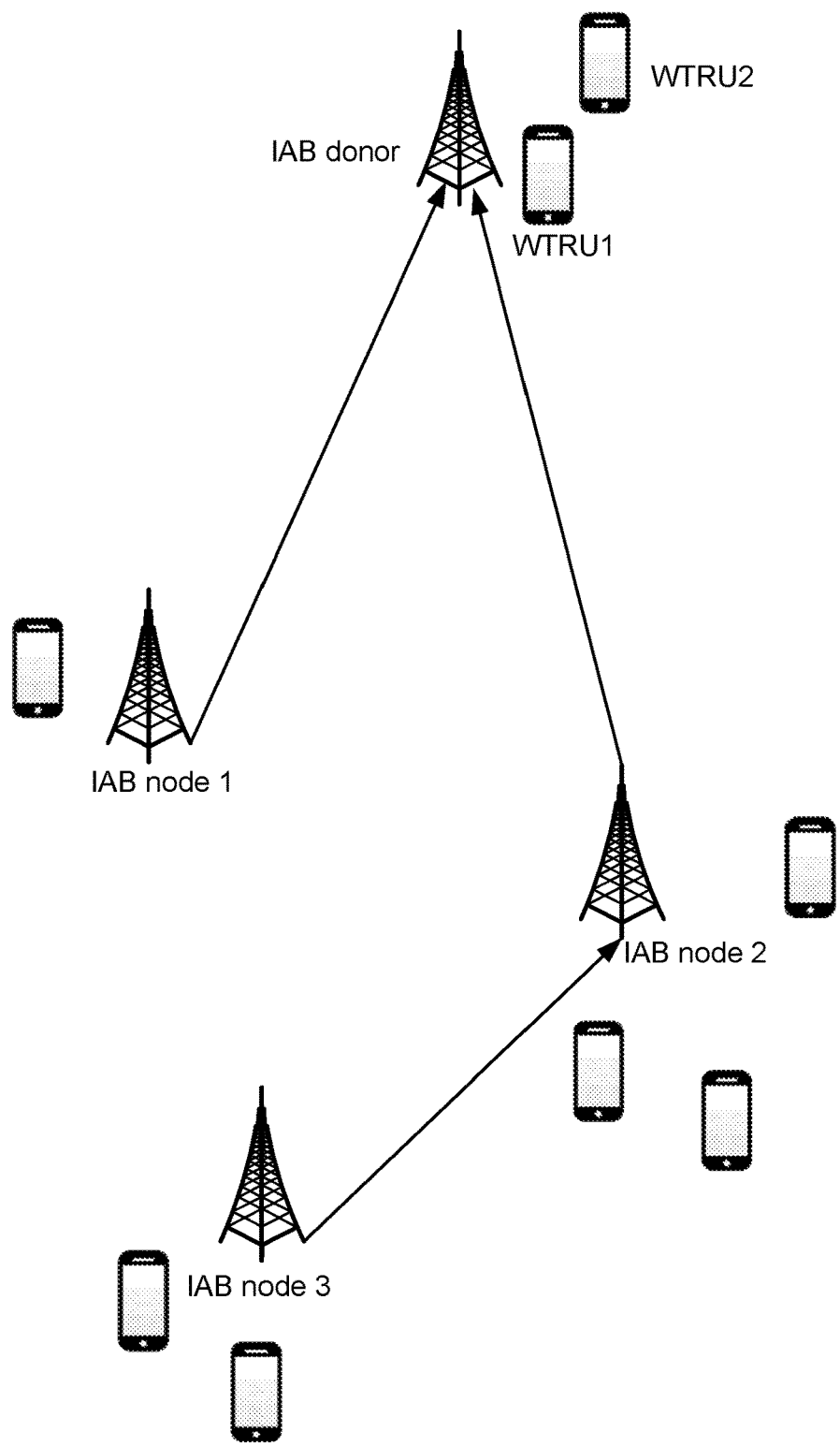
FIG. 7 illustrates an example with access WTRUs and IAB nodes served by parent IAB nodes or donor IAB nodes.

FIG. 7 illustrates an example of IAB nodes (e.g., a child IAB nodes) being served by a parent IAB nodes. As illustrated in FIG. 7, the IAB node 2 may be the parent node of IAB node 3. IAB node 2 may serve one or more WTRUs (e.g., multiple WTRUs). The RACH occasions for IAB node 2, and the RACH occasions for IAB node 3 as well as the WTRUs served by the IAB node 2 may perform random access that may be time division multiplexed (TDMed). One or more of the following may apply. The parent IAB node 2 may transmit a preamble using a RACH occasion. The parent IAB node 2 may inform its child IAB node (e.g., child IAB node 3) about the RACH occasions the parent IAB node 2 may use for transmitting a preamble. The child IAB node may not transmit its preamble on that RACH occasion (e.g., to avoid a conflict or collision between preamble transmissions). When IAB node 2 is not transmitting preambles, IAB node 2 may monitor the RACH occasion to detect a preamble transmission from one of the IAB node 2's child IAB nodes.

A transmission or a signal (e.g., a transmission to indicate the RACH occasion that IAB node2 is using) may be sent by IAB node2 to its child, IAB node 3. The transmission may be transmitted via DCI (e.g., a newly designed DCI) and may be delivered via physical downlink control channel (PDCCH). An IAB node may be configured to avoid a preamble transmission confliction. The IAB node may indicate that the IAB node is performing a PRACH to the IAB node's child nodes and/or access WTRUs. The IAB node may inform the child nodes and/or the access WTRUs about the IAB node's status. The IAB node's child nodes may decide whether to take action according to the received IAB node's status.

Figure 8:
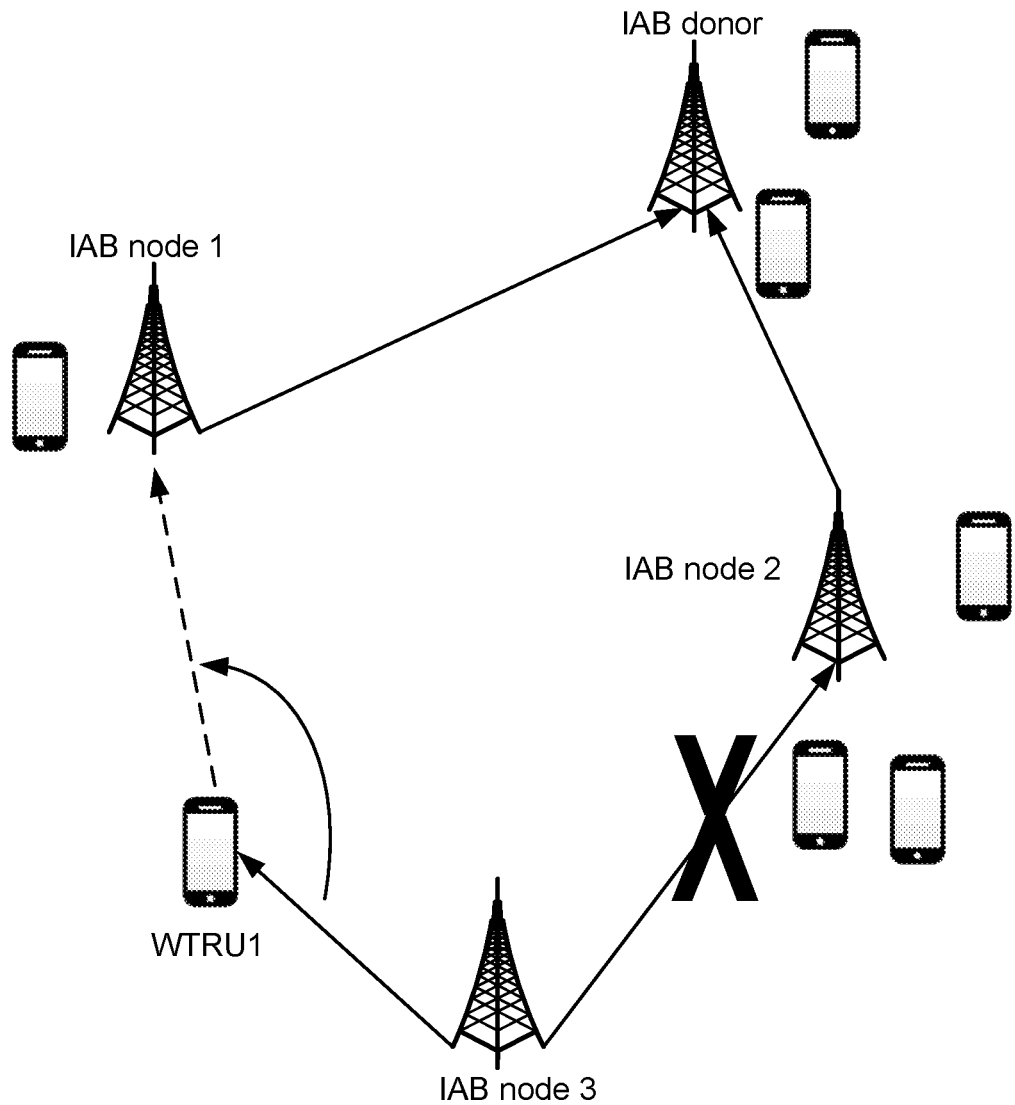
FIG. 8 illustrates an exemplary WTRU beam failure recovery or radio link failure recovery due to radio link failure associated with a parent IAB node or a donor IAB node.

An access WTRU and/or an IAB node may perform beam failure recovery. Beam failure recovery and/or radio link failure recovery for a WTRU may be caused or triggered by a beam failure or radio link failure (RLF) of the WTRU's parent IAB node. FIG. 8 illustrates an example of a WTRU beam failure recovery or radio link recovery due to a beam failure or radio link failure of a parent IAB node. As illustrated in FIG. 8, an IAB node 3 may be a parent node of the child WTRU, WTRU1. When IAB node 3 detects that a beam failure or radio link failure has occurred, IAB node 3's child WTRU, WTRU1 may result in a beam failure or radio link failure. WTRU1 may then perform beam failure recovery or radio link failure recovery.

As illustrated in FIG. 8, for example, considering a DL transmission, IAB node 2's access link may be synchronized with the DL transmission of an IAB node (e.g., IAB node 1) access link. WTRU1 may determine the timing difference of the channel time delay, $\Delta_t$, for example, by comparing the receive timing of the SSB of IAB node 1 and the receive timing of the SSB of IAB node 3. The difference of the channel time delay may be the difference between the channel used for IAB node 1 to WTRU1 and the channel used for IAB node 3 to WTRU1.

Figure 9:
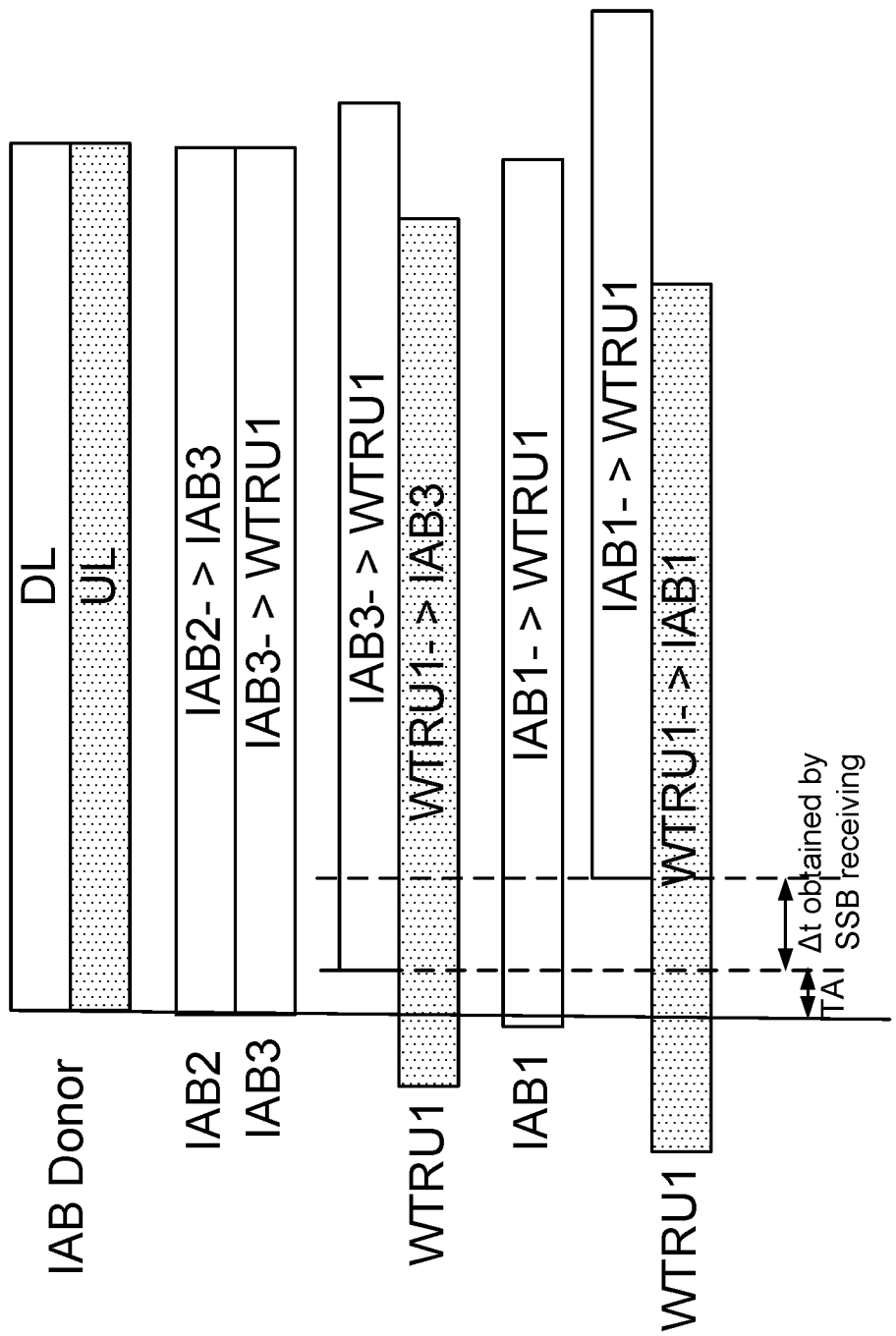
FIG. 9 illustrates an example of an access WTRU determining timing alignment and/or timing advance to be utilized for an access WTRU beam failure recovery.

FIG. 9 illustrates an example associated with timing alignment and timing advances determined by a desired WTRU, for example, to perform beam failure recovery. As described herein, WTRU1 may determine the timing advance value for IAB node 2. As described herein, the access WTRU, WTRU1 may determine the timing advance value for IAB node 3. WTRU1 may determine the timing advance value for IAB node 1 (e.g., based on $\Delta_t$+TA, where TA may be the timing advance value for IAB node 3).

As illustrated in FIG. 9, WTRU1 may utilize timing advance information (e.g., the timing information determined using one or more of the techniques described herein) to send an UL transmission to an IAB node. For example, WTRU1 may utilize the obtained timing advance to send a PRACH transmission (e.g., a PRACH preamble in 4-step RACH), a Msg A in 2-step RACH, an UL control signal, or an UL control channel to an IAB node. RACH (e.g., 4-step RACH or 2-step RACH) may be a contention-free RACH or contention-based RACH. In an example, RACH may be used for confirmation of timing advance or timing alignment that is obtained, for example, using SSB-based methods, as described herein. WTRU1 may send a PRACH transmission or an UL transmission in general to request a beam failure recovery. In an example, a WTRU may send a request to another IAB node (e.g., an IAB node not associated with the WTRU) for a beam failure recovery and to switch the WTRU's beam to another beam (e.g., a beam associated with another IAB node). As illustrated in FIG. 9, WTRU1 may send a request to IAB node 1 for its beam failure recovery or radio link recovery and the switch its beam to a beam associated with the IAB node 1. WTRU1 may utilize the timing information (e.g., the timing information determined based on the one or more techniques described herein) to receive a downlink transmission, such as, DL data, a control signal or control channel from IAB node 1.

Figure 10:
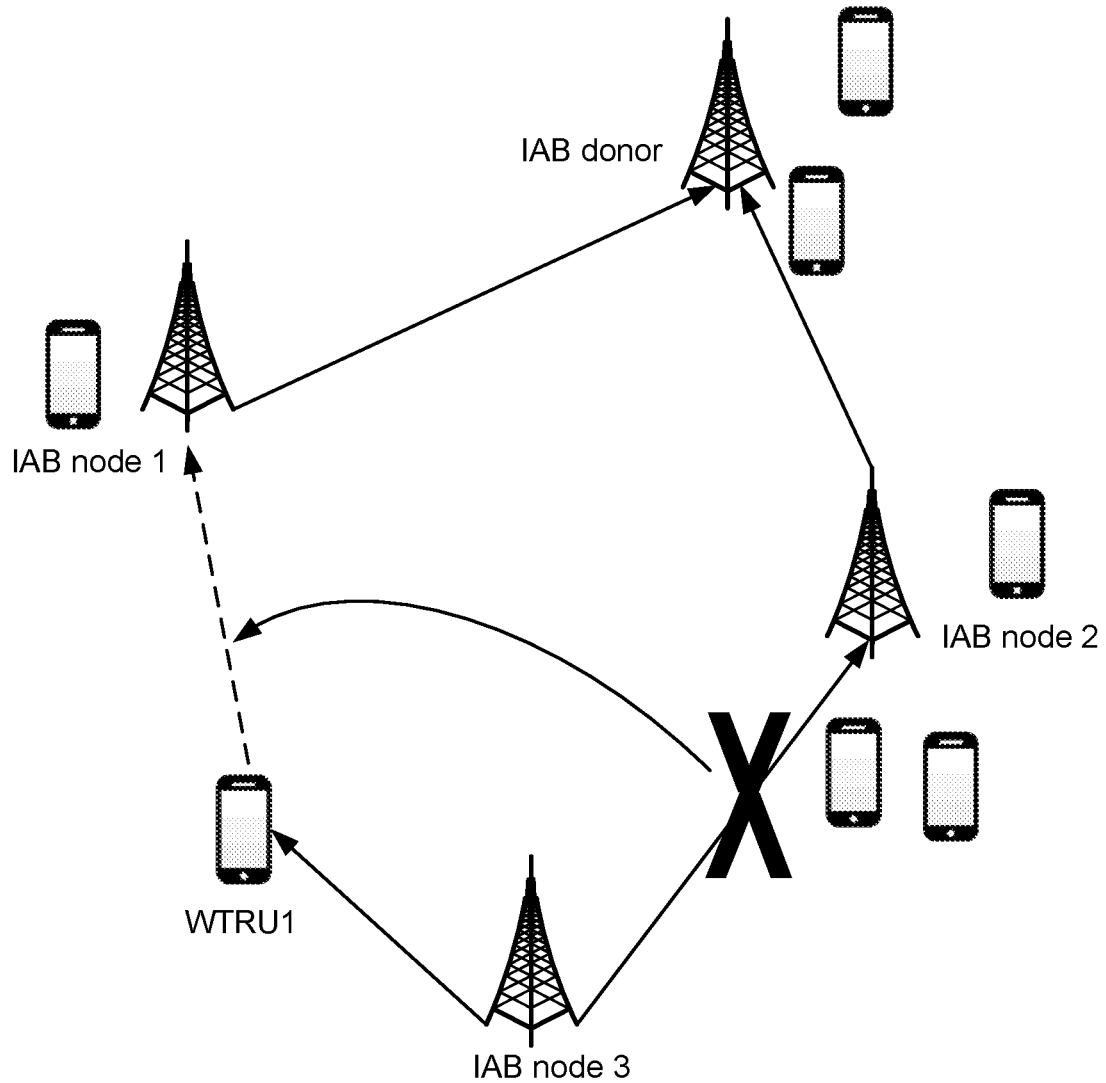
FIG. 10 illustrates an example of a beam failure recovery performed by an IAB node.

One or more of the techniques described herein may be utilized by an IAB node to perform radio link recovery, for example, as illustrated in FIG. 10. FIG. 10 illustrates an example of beam failure recovery, for example, using a timing advance value for a desired IAB node. As illustrated in FIG. 10, IAB node 3 may estimate the timing information, such as the timing advance value. IAB node 3 may use a similar RACH occasion (e.g., the same RACH occasion) as the access WTRU, WTRU1 and a similar preamble format (e.g., the same preamble format) as WTRU1 to send a PRACH preamble transmission. IAB node 3 may send the PRACH preamble transmission using the estimated timing advance value.

Figure 11:
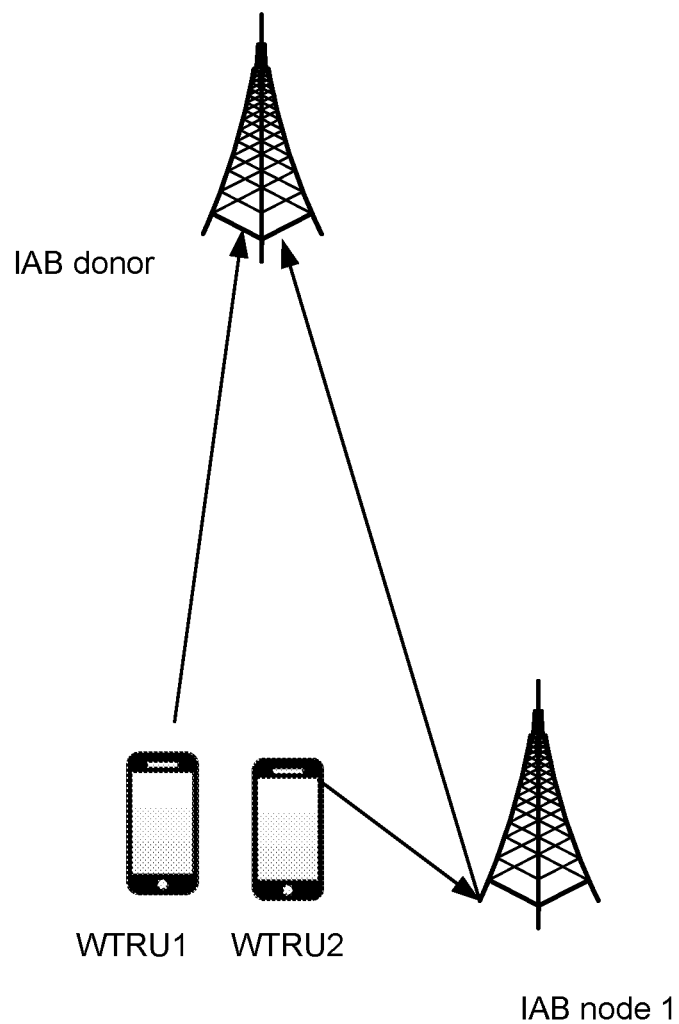
FIG. 11 illustrates an example of an access WTRU handling random access ambiguity in an IAB system.

An access WTRU may perform random access (e.g., enhanced random access) and resolve RAR ambiguity by handling multiple random access responses (RARs) from one or more IAB nodes. FIG. 11 illustrates an example of an IAB system where an ambiguity may arise when an access WTRU (e.g., WTRU1) receives multiple RARs from one or more IAB nodes. As illustrated in FIG. 11, one or more of the following may apply. WTRU1, although closer to IAB node 1 than the IAB donor node, may select the IAB donor node as its parent node. For example, WTRU1 may select the IAB donor node as its parent node based on the hop number. WTRU2 may select IAB node 1 as its serving node. In an example, each of the WTRUs, WTRU1 and WTRU2 may send a PRACH preamble transmission to their respective parent nodes (e.g., IAB donor and IAB node 1). The WTRUs may send the PRACH preamble transmissions simultaneously. WTRU1 and WTRU2 may choose a similar RACH occasion (e.g., the same RACH occasion) and a similar PRACH preamble and preamble index (e.g., the same PRACH preamble with the same preamble index) to send their respective PRACH preamble transmissions.

Figure 12:
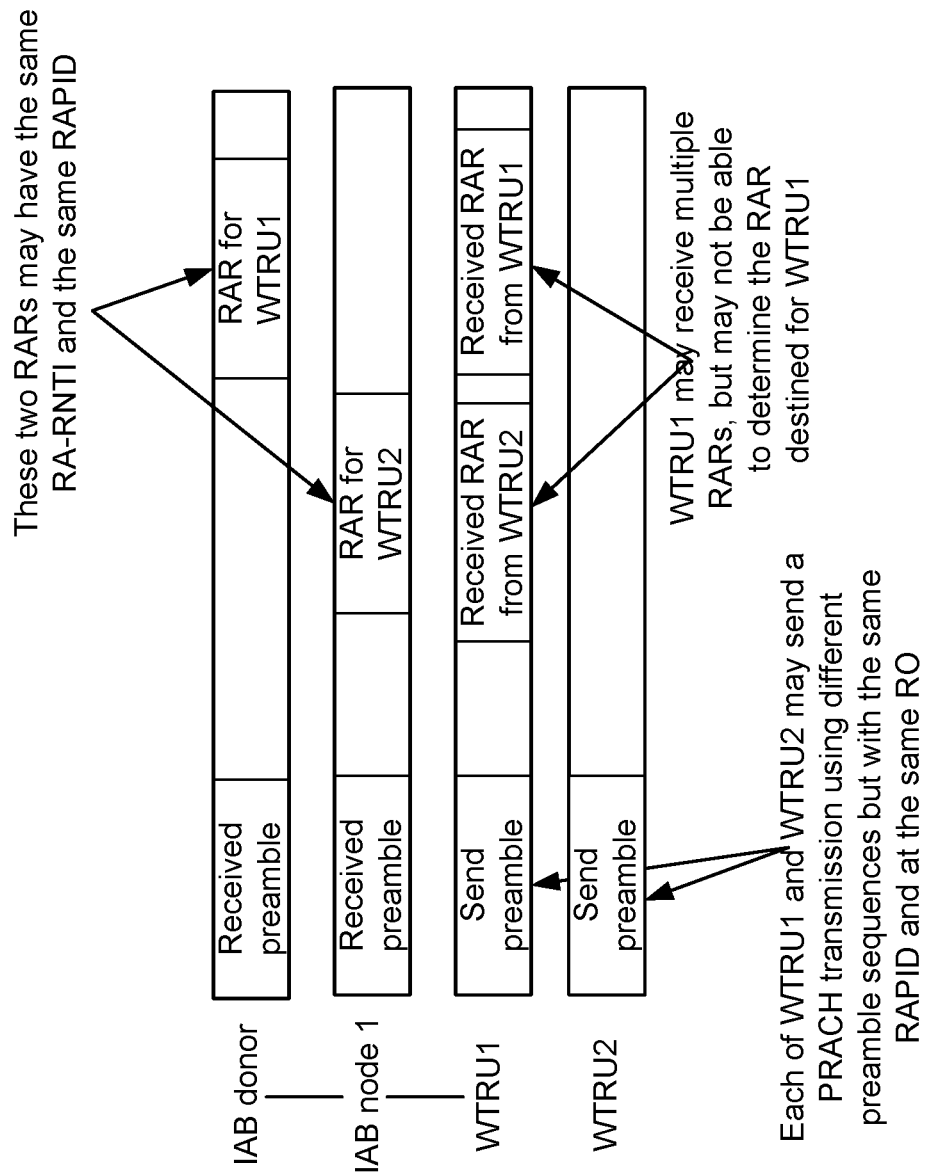
FIG. 12 illustrates an example of the two WTRUs of FIG. 11 performing RACH and random access response (RAR) ambiguity handling.

In an example, as illustrated in FIG. 12, WTRU1 and WTRU2 of FIG. 11 may have the same random access radio network temporary identifier (RA-RNTI) and the same random access preamble ID (RAPID). WTRU1 and WTRU2 may monitor for an RAR using its RA-RNTI and may obtain the RAPID via the RAR (e.g., after sending out the PRACH preamble). WTRU1 may receive the RAR that IAB node 1 had intended to send to WTRU2 (e.g., since WTRU2's RAR has the same RA-RNTI and RAPID as WTRU1). WTRU1 may receive two RARs. WTRU2 may receive one RAR from IAB donor node, which may be intended for WTRU1. WTRU2 may receive another RAR from IAB node 1, which may be intended for another WTRU (e.g., WTRU2). WTRU1 may differentiate between the received RARs (e.g., multiple RARs). WTRU1 may utilize one or more of the following to differentiate the RARs (e.g., the two RARs), it received from two or more IAB nodes (e.g., where one IAB node is IAB donor and the other IAB node is IAB node 1, as illustrated in FIG. 11). In an example, WTRU1 may distinguish between the RARs based on IAB node ID or index values. An IAB node ID or index value may be included in the RAR received by WTRU1 from an IAB node. For example, in the RAR content or payload, RA-RNTI and/or RAPID).

A root index for generating PRACH preambles may be included (e.g., in the RAR content, RA-RNTI, and/or RAPID), which may be used to differentiate IAB nodes. IAB nodes (e.g., each IAB node) may have different root index for generating PRACH preambles.

Information that may differentiate IAB nodes (e.g., two IAB nodes) may be included (e.g., in RAR content or payload, RA-RNTI and/or RAPID), which may be used to differentiate IAB nodes (e.g., by WTRU1). Information, such as, a group index, a partition index, an SSB index, a CSI-RS index, a beam index, a resource index and/or the like, that are specific to an IAB node (e.g., each IAB node) may be used to differentiate IAB nodes.

Although features and elements of the present disclosure may be described in particular combinations, features or elements may be used alone without other features and elements of the description or in various combinations with or without other features and elements. Although the features described herein may consider New Radio (NR), 3G, 4G, 5G, LTE, LTE-A, and/or other examples, it is understood that the features described herein are not restricted to these technologies and may be applicable to other wireless systems as well.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random-access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed is:

1. A wireless transmit/receive unit (WTRU) comprising a processor configured to at least:
   receive, from a first integrated access backhaul (IAB) node, a random access channel (RACH) occasion (RO) configuration information, wherein the RO configuration information indicates a set of RO resources;
   receive a physical downlink control channel (PDCCH) transmission comprising a downlink control information (DCI) that indicates an RO indicator (ROI), wherein the ROI comprises one or more RO resources of the set of RO resources that overlap with IAB node RO resources associated with the first IAB node;
   determine, based on the ROI and the set of RO resources, a subset of RO resources from the set of RO resources that are available for a physical random access channel (PRACH) transmission;
   select an RO resource from the subset of RO resources that are available for the PRACH transmission; and
   send a first PRACH transmission to the first IAB node using the selected RO resource.

2. The WTRU of claim 1, wherein the processor is further configured to receive from the first IAB node an indication that the one or more RO resources of the set of RO resources overlap with the IAB node RO resources.

3. The WTRU of claim 1, wherein the processor is further configured to receive the RO configuration information via a radio resource control (RRC) signaling or via system information.

4. The WTRU of claim 1, wherein the processor being configured to determine the subset of RO resources that are available for the PRACH transmission comprises the processor being configured to determine one or more RO resources of the set of RO resources that do not overlap with the IAB node RO resources.

5. The WTRU of claim 1, wherein the first PRACH transmission comprises a preamble.

6. The WTRU of claim 1, wherein the processor is configured to:
   determine a channel time delay timing difference between a first channel associated with the first IAB node and a second channel associated with a second IAB node;
   determine timing advance (TA) value associated with the second IAB node, wherein the TA value is determined based on the channel time delay timing difference between the first channel and the second channel and the TA value associated with the first IAB node;
   determine a radio link failure or a beam failure has occurred with the first IAB node; and
   send a second PRACH transmission to the second IAB node using the determined TA value associated with the second IAB node.

7. The WTRU of claim 6, wherein the channel time delay timing difference between the first channel and the second channel is determined by comparing a first receive timing obtained from a first synchronization signal block (SSB) received from the first IAB node and a second receive timing obtained from a second SSB received from the second IAB node.

8. A method implemented by a wireless transmit/receive unit (WTRU), the method comprising:
   receiving, from a first integrated access backhaul (IAB) node, a random access channel (RACH) occasion (RO) configuration information, wherein the RO configuration information indicates a set of RO resources;
   receiving a physical downlink control channel (PDCCH) transmission comprising a downlink control information (DCI) that indicates an RO indicator (ROI), wherein the ROI comprises one or more RO resources of the set of RO resources that overlap with IAB node RO resources associated with the first IAB node;
   determining, based on the ROI and the set of RO resources, a subset of RO resources from the set of RO resources that are available for a physical random access channel (PRACH) transmission;
   selecting an RO resource from the subset of RO resources that are available for the PRACH transmission; and
   sending a first PRACH transmission to the first IAB node using the selected RO resource.

9. The method of claim 8 further comprising receiving from the first IAB node an indication that the one or more RO resources of the set of RO resources overlap with the IAB node RO resources.

10. The method of claim 8, further comprising receiving the RO configuration information via a radio resource control (RRC) signaling or via system information.

11. The method of claim 8, wherein determining the RO resources that are available for the PRACH transmission comprises one or more RO resources of the set of RO resources that do not overlap with the IAB node RO resources.

12. The method of claim 8, wherein the first PRACH transmission comprises a preamble.

13. The method of claim 8 further comprising:
   determining a channel time delay timing difference between a first channel associated with the first IAB node and a second channel associated with a second IAB node;
   determining timing advance (TA) value associated with the second IAB node, wherein the TA value is determined based on the channel time delay timing difference between the first channel and the second channel and the TA value associated with the first IAB node;
   determining a radio link failure or a beam failure has occurred with the first IAB node; and send a second PRACH transmission to the second IAB node using the determined TA value associated with the second IAB node.

14. The method of claim 13, wherein the channel time delay timing difference between the first channel and the second channel is determined by comparing a first receive timing obtained from a first synchronization signal block (SSB) received from the first IAB node and a second receive timing obtained from a second SSB received from the second IAB node.

\* \* \* \* \*